United States Patent
Schneider

(10) Patent No.: US 11,965,535 B2
(45) Date of Patent: Apr. 23, 2024

(54) EXPANDABLE SCREW WITH SEPARATE EXPANSION FINGERS

(71) Applicant: Hilti Aktiengesellschaft, Schaan (LI)

(72) Inventor: Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 259 days.

(21) Appl. No.: 17/600,939

(22) PCT Filed: Apr. 27, 2020

(86) PCT No.: PCT/EP2020/061593
§ 371 (c)(1),
(2) Date: Oct. 1, 2021

(87) PCT Pub. No.: WO2020/225004
PCT Pub. Date: Nov. 12, 2020

(65) Prior Publication Data
US 2022/0196054 A1    Jun. 23, 2022

(30) Foreign Application Priority Data

May 6, 2019   (EP) .................................... 19172762

(51) Int. Cl.
*F16B 13/08*   (2006.01)
*F16B 25/00*   (2006.01)

(52) U.S. Cl.
CPC ...... *F16B 13/0875* (2013.01); *F16B 13/0883* (2013.01); *F16B 25/0026* (2013.01); *F16B 25/0094* (2013.01)

(58) Field of Classification Search
CPC .. F16B 37/12; F16B 13/0883; F16B 25/0094; F16B 13/0875; F16B 25/0026; F16B 35/041

(Continued)

(56) References Cited

U.S. PATENT DOCUMENTS 1,407,570 A * 2/1922 Peirce ................... F16B 13/066
                                                        411/17
1,468,074 A * 9/1923 Peirce ................... F16B 13/061
                                                        411/16

(Continued)

FOREIGN PATENT DOCUMENTS

CN    101793277 A    8/2010
CN    106133341 A    11/2016

(Continued)

OTHER PUBLICATIONS

PCT/EP2020/061593, International Search Report dated Jul. 8, 2020 (Three (3) pages).

*Primary Examiner* — Flemming Saether
(74) *Attorney, Agent, or Firm* — Crowell & Moring LLP

(57) ABSTRACT

A screw includes a shank where a thread helix receiving groove winds around the shank and is disposed in the shank. A thread helix is disposed in the thread helix receiving groove where the thread helix has an expandable helix section. The shank has, at the thread helix receiving groove, a wedge flank for radially expanding the expandable helix section as the shank is moved relative to the expandable helix section. The expandable helix section has a helical back and a plurality of expansion fingers projecting axially from the helical back towards the wedge flank. The wedge flank of the thread helix receiving groove is configured for radially displacing the plurality of expansion fingers outwardly as the shank is moved relative to the plurality of expansion fingers.

11 Claims, 3 Drawing Sheets

(58) Field of Classification Search
USPC .................................................. 411/16–18
See application file for complete search history.

(56) References Cited

U.S. PATENT DOCUMENTS

| | | | | |
|---|---|---|---|---|
| 2,837,005 | A | * | 6/1958 | Gaul .................. F16B 37/12 411/17 |
| 3,302,509 | A | * | 2/1967 | Modrey ............... E21D 21/008 411/80 |
| 3,967,525 | A | * | 7/1976 | Lerich ................ F16B 37/12 411/17 |
| 4,712,955 | A | * | 12/1987 | Reece ................. F16B 37/12 411/17 |
| 6,276,883 | B1 | | 8/2001 | Unsworth et al. |
| 6,461,092 | B2 | * | 10/2002 | Tseng ................. F16B 37/125 411/383 |
| 6,835,036 | B2 | * | 12/2004 | Paul .................. F16B 13/0883 411/16 |
| 8,430,617 | B2 | | 4/2013 | Hettich et al. |
| 9,517,519 | B2 | | 12/2016 | Hagel et al. |
| 10,233,957 | B2 | | 3/2019 | Hettich |
| 10,458,458 | B2 | | 10/2019 | Hakenholt et al. |
| 10,823,219 | B2 | * | 11/2020 | Hakenholt ......... F16B 25/0042 |
| 2010/0247267 | A1 | | 9/2010 | Bianchi et al. |
| 2018/0283435 | A1 | | 10/2018 | Hakenholt et al. |
| 2022/0299060 | A1 | * | 9/2022 | Heck .................. B28D 1/186 |

FOREIGN PATENT DOCUMENTS

| | | |
|---|---|---|
| DE | 10 2013 109 987 A1 | 3/2015 |
| TW | M258199 U | 3/2005 |
| TW | I350346 B1 | 10/2011 |
| WO | WO 2009/033637 A2 | 3/2009 |
| WO | WO 2011/063138 A1 | 5/2011 |

\* cited by examiner

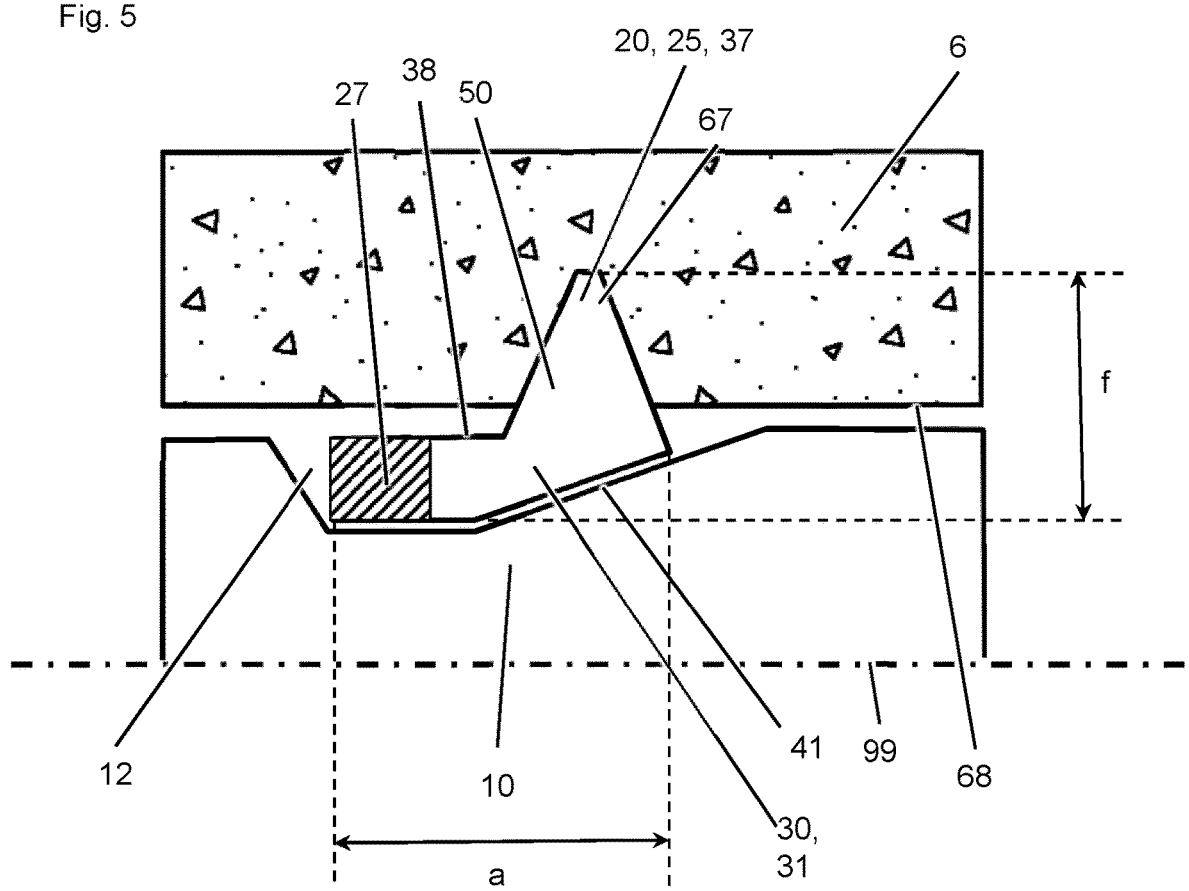

EXPANDABLE SCREW WITH SEPARATE EXPANSION FINGERS

BACKGROUND AND SUMMARY OF THE INVENTION

The invention relates to a screw. A screw of this type comprises a shank, wherein at least one thread helix receiving groove that winds around the shank is provided in the shank, and a thread helix, which is arranged in the thread helix receiving groove, wherein the thread helix has at least one expandable helix section, and wherein the shank has, at the thread helix receiving groove, a wedge flank for radially expanding the expandable helix section as the shank is moved relative to the expandable helix section.

US2010247267 A1 discloses concrete screws, i.e., screws that can be tappingly screwed into a borehole in a concrete substrate. The screws of US2010247267 A1 are monolithic.

US2018283435 A1 discloses a concrete screw that has a thread helix which is separate from the shank. The thread helix is located in a thread helix receiving groove that winds around the shank. The groove has an inclined rearwardly-facing wedge flank. Should the borehole, in which the screw is located, widen, e.g., in a seismic situation, the thread helix can glide onto this wedge flank and when doing so, it is displaced radially outwards by this inclined wedge flank. Thus, the wedge flank provides a wedge that can radially expand the thread helix, thereby maintaining engagement with the borehole wall. The groove also has an inclined forwardly-facing flank, but in contrast to the rearwardly-facing flank, the forwardly-facing flank is relatively steep, in order to avoid expansion of the thread helix when the screw is biased towards its screw tip during installation of the screw.

It is an object of the invention to provide a screw, in particular a concrete screw, which has, whilst being easy to manufacture, particularly high performance and/or which is particularly powerful.

According to the invention, the expandable helix section comprises a helical back and a plurality of expansion fingers that project axially from the helical back towards the wedge flank, wherein the helical back interconnects the expansion fingers, and wherein the wedge flank of the thread helix receiving groove is configured for radially displacing the expansion fingers outwardly as the shank is moved relative to the expansion fingers Accordingly, the expandable helix section comprises a plurality of distinct expansion fingers.

The invention is based on the finding that radial expansion of a thread helix is counteracted by hoop stresses, i.e., tangentially directed stresses, which build up as the thread helix is expanded, and which tend to pull the helix back into its original state. This effect can potentially impede the desired expansion. In view of this, a first aspect of the invention proposes to design that part of the expandable helix section which is located opposite the wedge flank, and which is intended to be radially expanded, in a discontinuous and physically interrupted manner. Accordingly, the expandable helix section comprises a plurality of expansion fingers, which are separate from each other in the circumferential direction. These expansion fingers face the wedge flank and are intended to be radially displaced by the wedge flank. Due to the separation of the expansion fingers, significantly less hoop stress will build up during expansion, allowing a particular easy and effective expansion. A second aspect of the invention proposed to provide the expandable helix section with a helical back, which interconnects the otherwise separate expansion fingers and keeps them in place. In addition to providing structural integrity, the helical back can transfer torsional loads, in particular during installation and/or loading of the fastener element. Accordingly, the overall structure of expandable helix section, comprising the expansion fingers and the helical back, can, whilst being particularly easy to manufacture, provide particularly good screw performance.

The screw can preferably be a concrete screw, intended to be placed in concrete or masonry. In particular, the screw can be a tapping screw, wherein the tapping action can either be effected by means of the thread helix or by additional threading structures.

Generally, providing an expandable helix section that is separate from the shank can provide a particular homogenous contact between the screw and the surrounding substrate, in particular if the borehole in which the screw is placed is not perfectly cylindrical. In case of a cracked concrete substrate and crack widening (e.g., during a seismic event), the expandable helix section can expand radially in order to compensate crack widening. As a consequence, a particularly good level of mechanical interlock and a correspondingly good load behavior can be obtained. Moreover, since the thread helix and the shank can be separately manufactured, a particularly good product quality can be achieved at particularly low effort.

The shank is preferably cylindrical. The shank has, in particular at its front end, a tip, which tip can also be blunt. The tip is intended to be first inserted into a borehole in which the screw is installed. For screwingly driving the shank, the screw may comprise a drive, which can in particular be located in a rearward region of the shank.

The thread helix and the shank are separate parts. The thread helix receiving groove forms a recess within the shank. The thread helix receiving groove winds around the shank in a helical manner, coaxial to the longitudinal axis of the screw. The thread helix and the shank are separate parts, i.e., they are non-monolithic. In particular, the thread helix is, at least partly, displaceable relative to the shank.

Preferably, the thread helix and the shank consist of different materials, in particular chosen according to the intended purpose of each component. The thread helix material can for example be chosen for maximum hardness that allows for easy, fast and reliable cutting in concrete, whereas the shank material can be chosen for high toughness and high strength. The difference in materials can be amongst others in composition and structure. The thread helix can preferably consist of steel, in particular carbon steel or stainless steel. The shank can preferably consist of steel, in particular carbon steel or stainless steel.

The expandable helix section can span all of the thread helix. However, it can also span only a fraction of the thread helix. The thread helix can also have additional expandable helix sections, which can be designed in analogy to the at least one expandable helix section, or differently.

The wedge flank delimits the thread helix receiving groove, in particular at the groove's forward face. In particular, the wedge flank forms an interface of the shank to the thread helix receiving groove. The wedge flank forms a helical wedge, which radially expands the expandable helix section as the shank is moved relative to the expandable helix section, in particular in the pull-out direction of the screw, i.e., in the direction originating at the tip and extending from there axially, i.e., parallel to the longitudinal axis of the screw, along the shank, in particular the direction in which the screw is intended to be tensilely loaded. The wedge flank thus preferably faces rearwardly, towards the drive, away from the tip. In particular, the wedge flank can be intended for radially expanding the expandable helix section as the shank is moved relative to the expandable helix section in the pull-out direction of the screw. Accordingly, the wedge flank is preferably a forwardly-located and/or rearwardly facing wedge flank. In particular, the wedge flank can be conical.

The expandable helix section expands by a gliding movement onto the wedge flank. The contact face of the expandable helix section, contacting the wedge flank, acts as a gliding counterpart. In particular, the contact face is provided at the expansion fingers.

The helical back is in particular coaxial with the longitudinal axis of the screw. The expansion fingers can preferably project from the helical back in the forwards direction, i.e., towards the tip. The wedge flank of the helix receiving groove is configured for radially displacing the expansion fingers outwardly, in particular as the shank is moved relative to the expandable helix section, in particular in the pull-out direction of the screw. The helical back connects all of the expansion fingers. The expansion fingers are adjacent to the helical back. Since the helical back has helical geometry, the expansion fingers also follow a helical shape. In particular, the wedge flank of the helix receiving groove can be configured for radially displacing the expansion fingers outwardly as the shank is moved relative to the expansion fingers in the pull-out direction of the screw.

Where the terms "axially", "longitudinally", "radially", "radially outwardly" and "circumferentially" are used, this refers in particular to the longitudinal axis of the screw. In particular, this is the axis around which the screw is intended to be rotated for screwing-in and/or screwing out. The numerous helical structures mentioned here are especially arranged coaxial with the longitudinal axis. Where elements are to be displaced radially outwardly, this is with respect to the longitudinal axis, i.e., the distance from the longitudinal axis is increased.

Preferably, at least some of the expansion fingers, more preferably all of the expansion fingers, are thread-engaging expansion fingers. Thread-engaging expansion fingers, as such, each comprise at least one thread engagement element, which radially protrudes on the respective expansion finger, for engaging into a first female thread groove, wherein the wedge flank of the helix receiving groove is configured for radially displacing the thread engagement elements outwardly as the shank is moved relative to the thread-engaging expansion fingers, in particular in the pull-out direction of the screw. Accordingly, each of the thread-engaging expansion fingers comprises at least one thread engagement element, wherein all of the thread engagement elements are arranged on a virtual helix around the screw's longitudinal axis, so that they can all engage into one and the same first female thread groove, which first female thread groove is in particular provided in the wall of a cylindrical borehole. An interlock between the screw and the surrounding substrate can thus be achieved at the thread-engaging expansion fingers, which can provide particularly efficient load transfer and thus particularly good load values. In case of crack widening, the wedge mechanism provided at the wedge flank can maintain this interlock by further radially displacing the thread engagement elements, thus providing a self-sustaining interlock mechanism.

The thread-engaging expansion fingers can also have additional protrusions, which are not intended to engage into the first female thread groove. It is particularly preferred if each thread-engaging expansion finger comprises precisely on thread engagement element, which can be advantageous from a manufacturing perspective.

It is particularly preferred if the thread engagement elements are projecting helical ribs, which can, amongst others, be advantageous in view of load transfer surface and manufacturing effort. More particularly, the thread engagement elements of all thread-engaging expansion fingers can form a discontinuous thread, which is interrupted by separation slots. This can be advantageous in view of screw installation and load transfer.

On at least one of the thread-engaging expansion fingers, preferably on all of them, the respective thread engagement element is preferentially arranged at the free axial end of the respective thread-engaging expansion finger, i.e., at that end which is located remote from the finger's interface with the helical back. This can permit particularly wide displacement and thus particularly good interlock.

According to another preferred embodiment of the invention, at least three adjoining expansion fingers of the expandable helix section are thread-engaging expansion fingers. This can provide particularly homogenous and efficient interlock.

It is further particularly preferred that the thread-engaging expansion fingers each have a friction surface for frictionally engaging the borehole wall in two dimensions, wherein the wedge flank of the helix receiving groove is configured for radially displacing the friction surfaces outwardly as the shank is moved relative to the thread-engaging expansion fingers, in particular in the pull-out direction of the screw. Accordingly, radial expansion introduces friction between the thread-engaging expansion fingers and the borehole wall, i.e., the substrate. This can provide an additional load transfer mechanism (in addition to mechanical interlock at the thread engagement elements), which can allow for significantly higher loads. Moreover, radial expansion and direct two-dimensional contact between the friction surfaces of the thread-engaging expansion fingers and the borehole wall can introduce compressive stress within the substrate in the vicinity of the first female thread groove, i.e., where load transfer via interlock takes place. In particular if the substrate is a concrete substrate, this effect can stabilize the system, and thus increases local substrate resistance, potentially resulting in a further improved overall load performance. The friction surface is intended for engaging the borehole wall in two dimensions, i.e., not only linearly. The friction surface is intended for frictionally engaging the borehole wall in order to effect static or dynamic friction at the borehole wall. Preferably, in an overall view, all of the friction surfaces form a discontinuous helical friction zone, interrupted by the separation slots.

On at least some of the thread-engaging expansion fingers, preferably on all of them, the respective friction surface can preferentially be located adjacent to the respective thread engagement element, which can allow a particularly compact and yet efficient design.

According to a further advantageous example, on at least one of the thread-engaging expansion fingers, the respective thread engagement element is located axially between the respective friction surface and the free axial end of the respective thread-engaging expansion finger. In other words, the thread engagement element is located rearwardly of the thread engagement element, axially between the thread engagement element and the finger's interface with the helical back. In particular, the friction surface can also form a pivot for radial expansion of the respective finger, leading to a particular compact design. At least one of the thread-engaging expansion fingers can also have auxiliary frictional surfaces located elsewhere.

Preferably at least some of the friction surfaces, more preferably all of them, have arcuate cross-section throughout. This allows for a particularly good frictional contact with an approximately cylindrical borehole wall. Preferably, the friction surfaces can be cylinder cut-outs.

The expandable helix section is a ribbon, wherein the axial width of the ribbon is larger than the radial height of the ribbon. Having the ribbon wider than high can efficiently counteract a tilting tendency of the expandable helix section when the shank is moved relatively to the expandable helix section, further improving performance.

Preferably, the thread engagement element and the friction surface of each expansion finger are monolithic, i.e., they are a single piece. The helical back and at least some of the expansion fingers, preferably all of them, at least the friction surfaces thereof, are, advantageously, monolithic. This can be advantageous in view of manufacturing effort and robustness.

The expandable helix section preferably comprises 2 to 10 expansion fingers per turn of the thread helix, i.e., the number of fingers per helix turn is any number between 2 and 10, including 2 and 10. This allows particular uniform interaction with the surrounding substrate, which can be advantageous in view of performance. When the expansion fingers are separated by separation slots, the expandable helix section preferably comprises 2 to 10 separation slots per turn of the thread helix.

As already mentioned, the expansion fingers are preferably separated by separation slots. These separation slots intersect the expandable helix section in the circumferential direction and thereby define the expansion fingers. The expansion fingers are preferably non-overlapping, in particular in the circumferential direction. Each of the separation slots extends from the free axial end of the expandable helix section, i.e., from its forward edge, towards the rear of the screw, i.e., away from the screw's tip. Preferably, the axial length of the separation slots is at least 80% of the axial width of the thread helix ribbon, leading to distinctive expansion fingers.

The separation slots preferably each extend parallel to the longitudinal axis of the screw. This can be advantageous from a manufacturing point of view and/or can prevent conflicts between expanding expansion fingers in a particularly easy manner.

Advantageously, the separation slots each extend in a longitudinal plane of the screw, i.e., in a plane that includes the longitudinal axis. This can further facilitate manufacturing and/or improve performance.

The invention also relates to the intended use of the screw. In particular, in use, the screw can be screwingly inserted into a borehole and subsequently, the shank is loaded in the pull-out direction of the screw so as to radially bias the expansion fingers via the wedge flank.

Features that are described here in connection with the inventive screw can also be used in connection with the inventive use and features that are described here in connection with the inventive use can also be used in connection with the inventive screw The invention is explained in greater detail below with reference to preferred exemplary embodiments, which are depicted schematically in the accompanying drawings, wherein individual features of the exemplary embodiments presented below can be implemented either individually or in any combination within the scope of the present invention.

The following description explains the invention using illustrative embodiments and drawings.

BRIEF DESCRIPTION OF THE DRAWINGS

FIG. 5 is a cross-sectional view of a detail of a middle region of the screw, in which the cross-sectional plane is a longitudinal plane that runs through one of the separation slots.

DETAILED DESCRIPTION OF THE DRAWINGS

Figure 1:
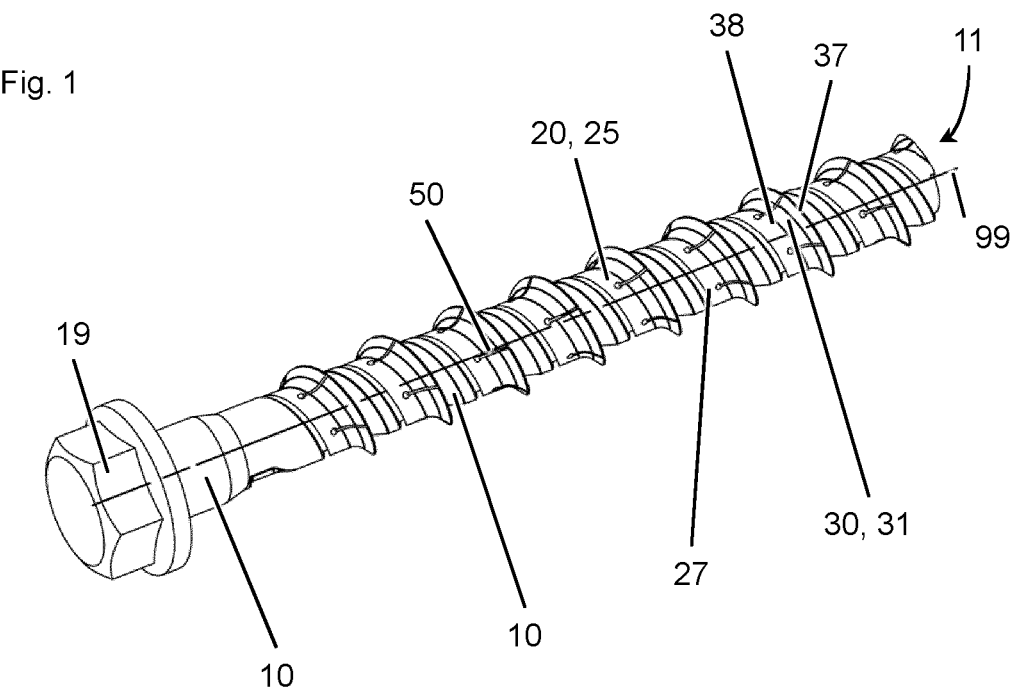
FIG. 1 is a perspective representation of a screw.
Figure 2:
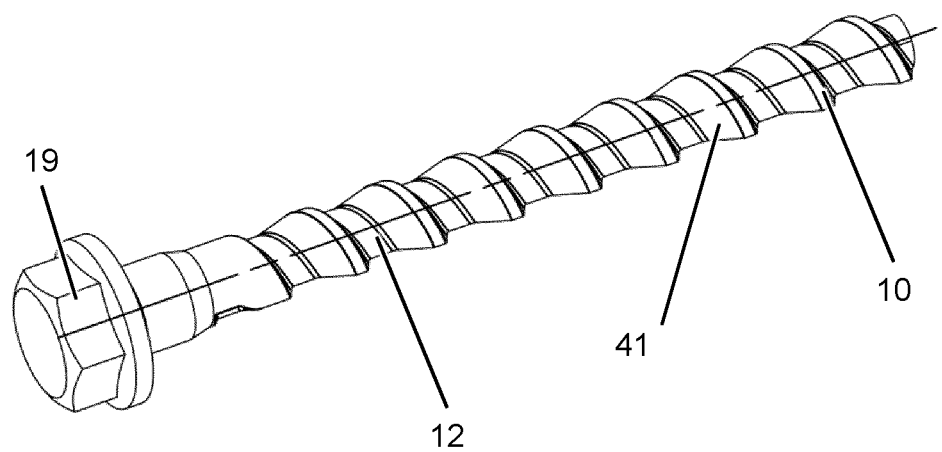
FIG. 2 is a perspective representation, similar to FIG. 1, of the screw of FIG. 1, but with the thread helix omitted.
Figure 3:
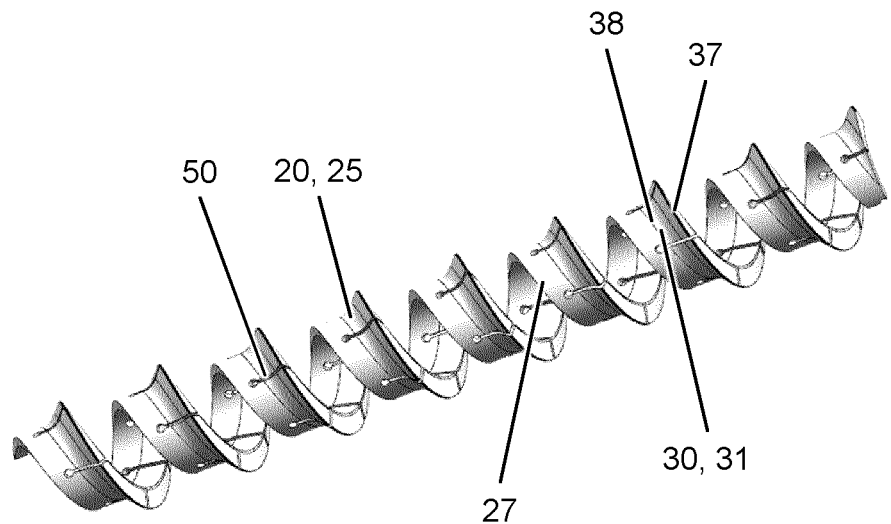
FIG. 3 is a perspective representation, similar to FIG. 1, of the thread helix of the screw of FIG. 1 only.
Figure 4:
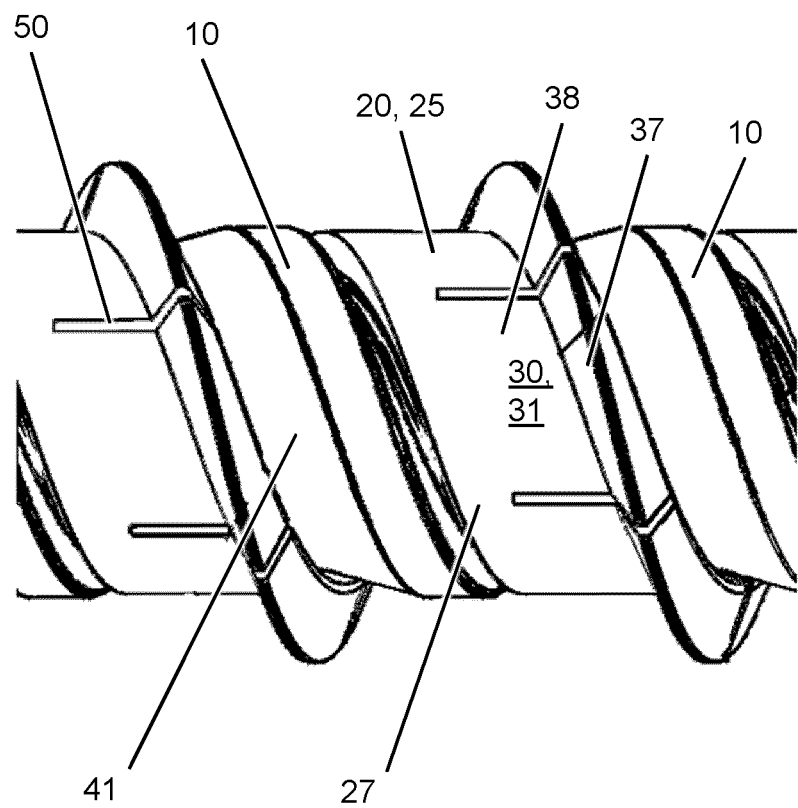
FIG. 4 is a detail side view of the screw in a middle region of the shank.

The figures show an embodiment of an inventive screw. The screw comprises a shank 10 having a tip 11 at its front end. The screw further comprises a drive 19 for transmitting torque to the shank 10 for rotating the shank 10 around the longitudinal axis 99 of the screw. In the present embodiment, the drive 19 is a hex drive provided at a screw head. However, this is an example only, and any type of drive could be used, such as a slotted drive, a cruciform drive, a lobular drive, an internal polygon drive, an external polygon drive or a special drive.

The screw furthermore comprises a helical thread helix 20, wherein the thread helix 20 and the shank 10 are separate elements. Both the thread helix 20 and the shank 10 can consist of metal.

The shank 10 is provided with a helical thread helix receiving groove 12, winding around the shank 10 and around the longitudinal axis 99 of the screw. The thread helix 20 is positioned in this thread helix receiving groove 12.

The thread helix 20 comprises an expandable helix section 25, which can be radially, with respect to the longitudinal axis 99, expanded by the shank 10, as will be explained in detail further below. The expandable helix section 25 is a ribbon, wherein the axial width a of the ribbon is larger than the radial height f of the ribbon. In the present embodiment, the expandable helix section 25 extends along the entire thread helix 20. But this is an example only. The expandable helix section 25 could as well span only a fraction of the thread helix 20.

The expandable helix section 25 comprises a helical back 27 and a plurality of expansion fingers 30, wherein the helical back 27 and the expansion fingers 30 are preferably monolithic. The expansion fingers 30 axially project from the helical back 27 towards the tip 11 of the screw, i.e., in the forward direction. Neighboring expansion fingers 30 are separated by separation slots 50 which intersect the expandable helix section 25, which separation slots 50 originate at the forward face, i.e., at the tipward face, of the expandable helix section 25, and extend from there rearwardly towards the helical back 27. Neighboring expansion fingers 30 are non-overlapping in the circumferential direction of the screw. The expansion fingers 30 form a helix structure which is intersected by the separation slots 50.

In the shown embodiment, each of the separation slots 50 extends parallel to the longitudinal axis 99 of the screw, and each of the separation slots 50 extends in a longitudinal plane of the screw, i.e., in a plane that contains the longitudinal axis 99. As can be seen in FIG. 5, the separation slots 50 extend, radially, all the way through the thread helix 20.

The forward, i.e., the tipward, end of the thread helix receiving groove 12 is delimited by a wedge flank 41. At this wedge flank 41, the radius of the shank 10 increases towards the tip 11. The wedge flank 41 thus faces rearwardly, away from the tip 11. When the shank 10 is moved rearwardly, i.e., in the pull-out direction, relative to the thread helix 20, the wedge flank 41 can abut against the expansion fingers 30 and force them radially outwards, thus expanding the expandable helix section 25 of the thread helix 20.

In the shown embodiment, all of the expansion fingers 30 are thread-engaging expansion fingers 31. A thread-engaging expansion finger 31 is characterized in that it has a thread engagement element 37, wherein the thread engagement elements 37 of all thread-engaging expansion fingers 31 are so arranged that they can engage into a single, common first female thread groove 67 provided in the wall of a borehole in a substrate 6, in particular a concrete or masonry substrate. Accordingly, all of the thread engagement elements 37 are arranged on a virtual thread helix. The thread engagement elements 37 are projecting helical ribs in the present embodiment, and therefore, the thread engagement elements 37 form, in an overall view, a discontinuous thread crest. The thread engagement elements 37 are arranged at the free forward, i.e., tipward, ends of the thread-engaging expansion fingers 31, so that they can be displaced by the wedge flank 41.

Adjacent to the thread engagement element 37, which means rearwardly in the present embodiment, each thread-engaging expansion fingers 31 comprises a friction surface 38 intended for frictionally acting in two dimensions against the cylindrical borehole wall 68 of the borehole in the substrate 6. Accordingly, the friction surfaces 38 are intended for pressing against the cylindrical borehole wall 68 on extended surface region. In the present embodiment, the friction surface 38 has arcuate cross-section throughout and has the shape of a cut-out of a cylinder. The friction surfaces 38 are located adjacent to the helical back 27, axially between the helical back 27 and the thread engagement element 37 of the respective thread-engaging expansion finger 31.

In use, the shank 10 of the screw is placed in a borehole in a substrate 6, in particular a concrete or masonry substrate, so that the thread engagement elements 37 of the thread-engaging expansion fingers 31 all engage into a first female thread groove 67 provided in the wall of the borehole. If the screw is a tapping screw, the first female thread groove 67 can be cut by the screw itself, in particular by its thread helix 20, preferably by the thread engagement elements 37. In an alternative embodiment, the screw could, however, also be non-tapping—in this case, the first female thread groove 67 could also be provided by a separate thread cutting tool. Torsional load transfer between the shank 10 and the thread helix 20 for screwing-in and, if required, tapping action could for example be realized by geometrically interlocking the thread helix 20 with the shank 10 or/and by local joining through welding or brazing.

The shank 10 is then loaded in the pull-out direction, i.e., away from the tip 11. This loading will cause the wedge flank 41 to load the thread-engaging expansion fingers 31 radially outwardly, forcing the thread engagement elements 37 deeper into the first female thread groove 67 and/or pressing the friction surface 38 against the cylindrical borehole wall 68 of the borehole, both of which mechanisms can improve anchorage of the screw within the substrate.

In particular, the friction surface 38 can provides additional load transfer due to friction between the deformed expandable helix section 25 and the substrate 6. Moreover, the friction surface 38 can introduce a compressive pressure situation in the substrate 6 that can further increase the loading capacity of the substrate 6, in particular if the substrate 6 is a concrete substrate.

The expansion fingers 30 and in particular the thread-engaging expansion fingers 31 form a discontinuous helical structure, separated by the separation slots 50. The discontinuous character facilitates radial displacement of the expandable helix section 25 by the wedge flank 41, in particular by reducing circumferential tension.

The invention claimed is:

1. A screw, comprising:
a shank (10), wherein a thread helix receiving groove (12) that winds around the shank (10) is disposed in the shank (10); and
a thread helix (20) which is disposed in the thread helix receiving groove (12);
wherein the thread helix (20) has an expandable helix section (25);
wherein the shank (10) has, at the thread helix receiving groove (12), a wedge flank (41) for radially expanding the expandable helix section (25) as the shank (10) is moved relative to the expandable helix section (25);
wherein the expandable helix section (25) comprises a helical back (27) and a plurality of expansion fingers (30) that project axially from the helical back (27) towards the wedge flank (41), wherein the helical back (27) interconnects the plurality of expansion fingers (30), and wherein the wedge flank (41) of the thread helix receiving groove (12) is configured for radially displacing the plurality of expansion fingers (30) outwardly as the shank (10) is moved relative to the plurality of expansion fingers (30);
wherein at least some of the plurality of expansion fingers (30) are thread-engaging expansion fingers (31) which each comprise a thread engagement element (37) which radially protrudes on the respective thread-engaging expansion finger (31) and wherein the wedge flank (41) of the thread helix receiving groove (12) is configured for radially displacing the thread engagement elements (37) outwardly as the shank (10) is moved relative to the thread-engaging expansion fingers (31).

2. The screw according to claim 1, wherein the thread engagement elements (37) are projecting helical ribs and wherein the thread engagement elements (37) of the thread-engaging expansion fingers (31) form a discontinuous thread.

3. The screw according to claim 1, wherein on at least one thread-engaging expansion finger (31), the respective thread engagement element (37) is disposed at a free axial end of the at least one thread-engaging expansion finger (31).

4. The screw according to claim 1, wherein at least three adjoining expansion fingers (30) of the expandable helix section (25) are thread-engaging expansion fingers (31).

5. The screw according to claim 1, wherein the thread-engaging expansion fingers (31) each have a friction surface (38) and wherein the wedge flank (41) of the thread helix receiving groove (12) is configured for radially displacing the friction surfaces (38) outwardly as the shank (10) is moved relative to the thread-engaging expansion fingers (31).

6. The screw according to claim 5, wherein on at least one thread-engaging expansion finger (31), the respective thread engagement element (37) is located axially between the respective friction surface (38) and a free axial end of the at least one thread-engaging expansion finger (31).

7. The screw according to claim 5, wherein at least some of the friction surfaces (38) have an arcuate cross-section throughout.

8. The screw according to claim 1, wherein the expandable helix section (25) is a ribbon and wherein an axial width (a) of the ribbon is larger than a radial height (f) of the ribbon.

9. The screw according to claim 1, wherein the helical back (27) and at least some of the plurality of expansion fingers (30) are monolithic.

10. The screw according to claim 1, wherein the expandable helix section (25) comprises 2 to 10 expansion fingers (30) per turn of the thread helix (20).

11. A method of using the screw according to claim 1, comprising the steps of:
  screwingly inserting the screw into a borehole; and
  subsequently to the screwingly inserting, loading the shank (10) in a pull-out direction of the screw to radially bias the plurality of expansion fingers (30) via the wedge flank (41).

\* \* \* \* \*